Jan. 19, 1965   J. S. CHRISTIANSEN   3,165,764
DETACHABLE COUPLING FOR SWIMMING FIN
Filed Oct. 15, 1962   7 Sheets-Sheet 1
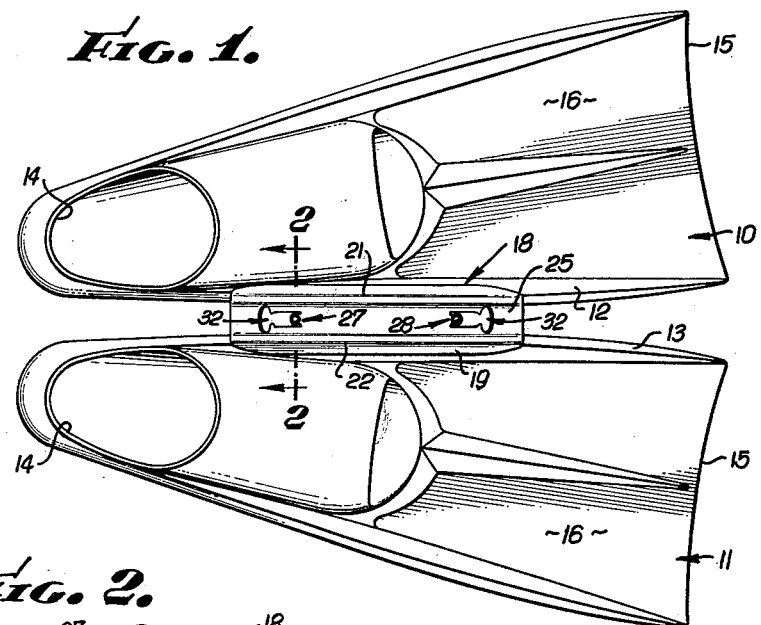
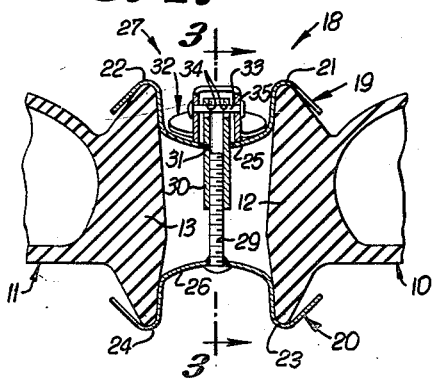
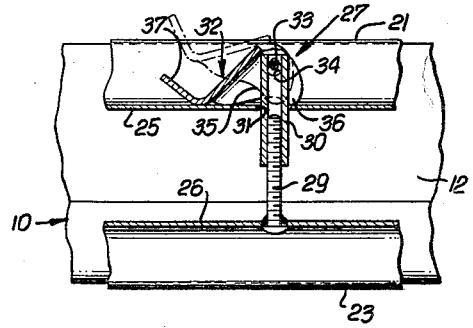
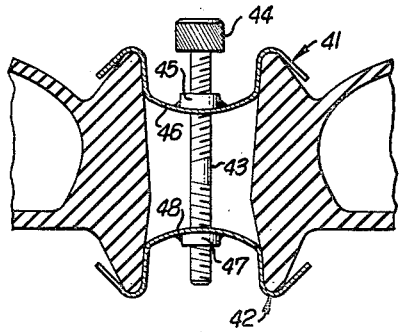
INVENTOR.
JAMES S. CHRISTIANSEN
BY
Flam and Flam
ATTORNEYS.

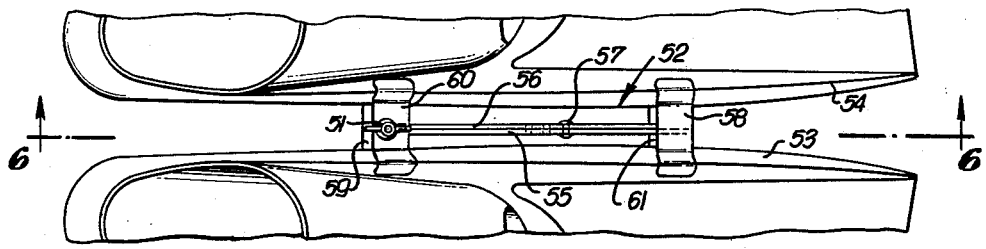# DETACHABLE COUPLING FOR SWIMMING FIN
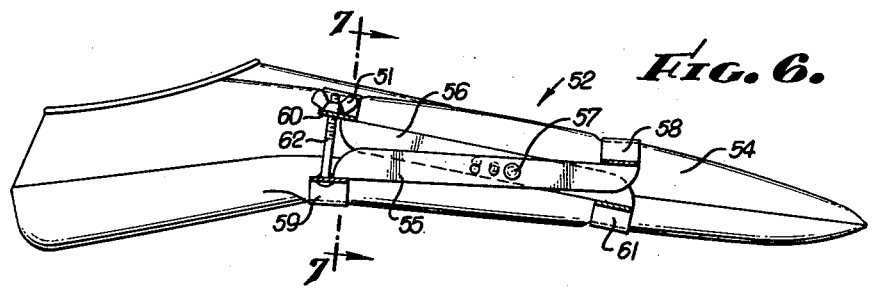
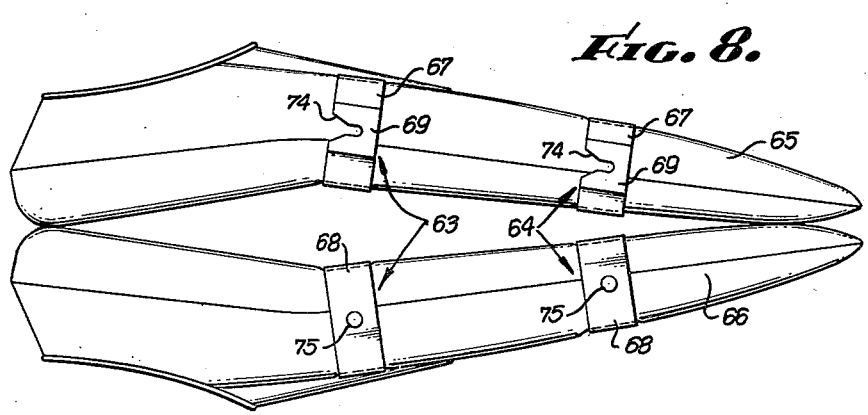
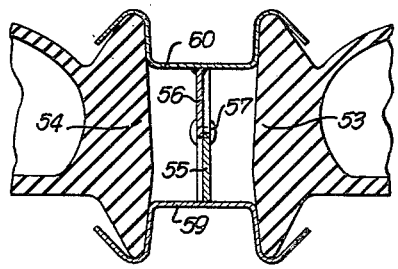
INVENTOR.
JAMES S. CHRISTIANSEN
BY
Flam and Flam
ATTORNEYS.

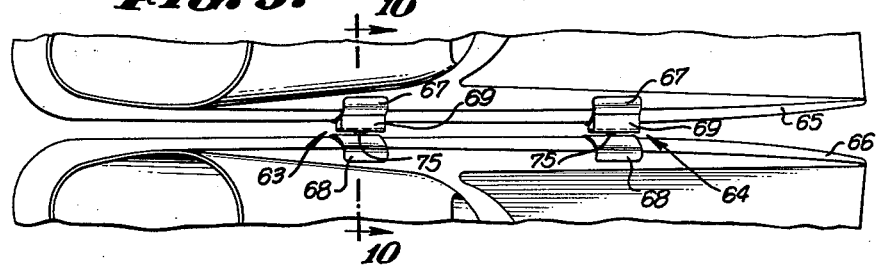

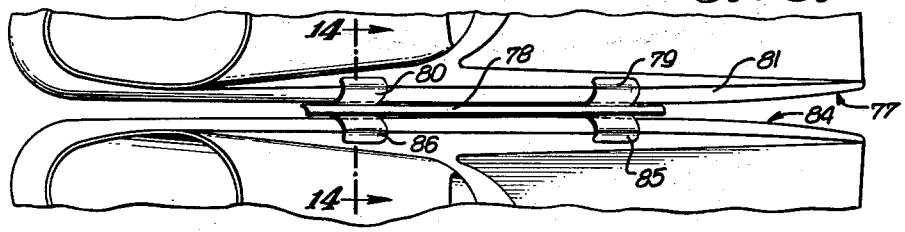
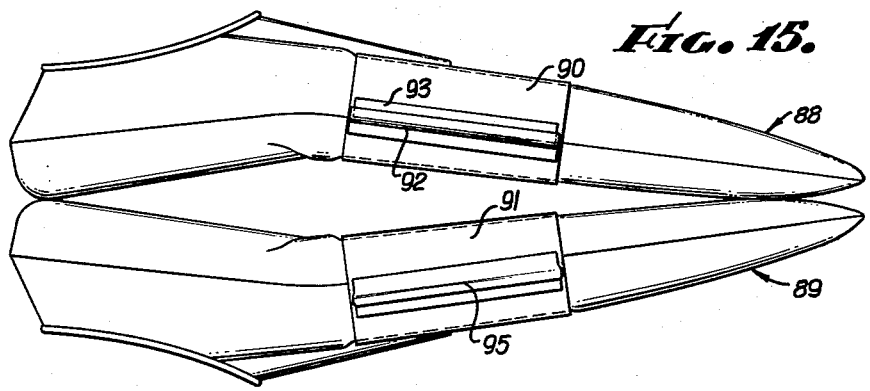
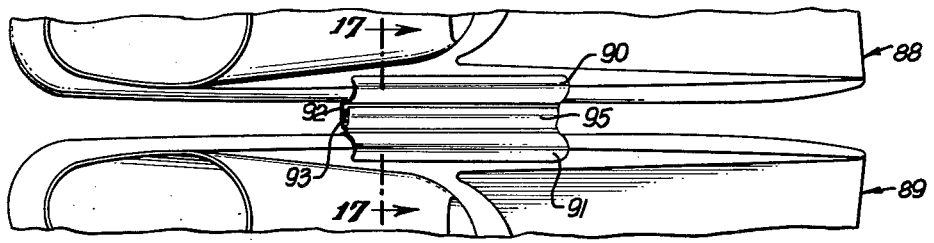
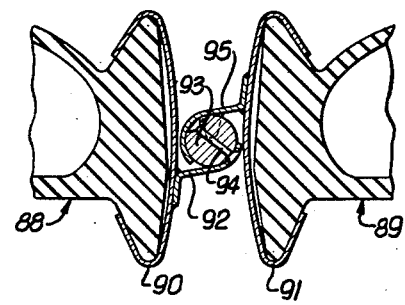

Jan. 19, 1965    J. S. CHRISTIANSEN    3,165,764
DETACHABLE COUPLING FOR SWIMMING FIN
Filed Oct. 15, 1962    7 Sheets-Sheet 5

INVENTOR.
JAMES S. CHRISTIANSEN
BY
Flam and Flam
ATTORNEYS.

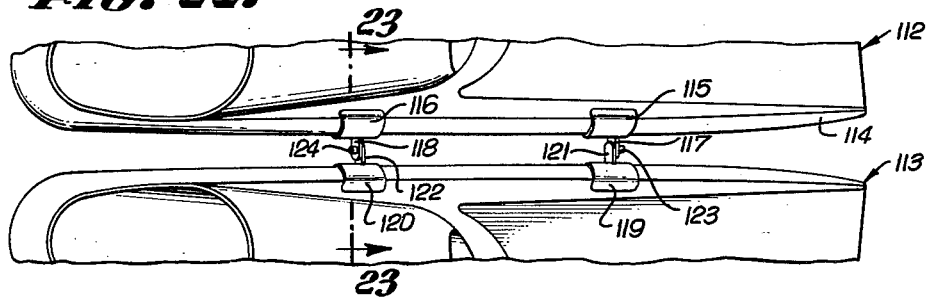
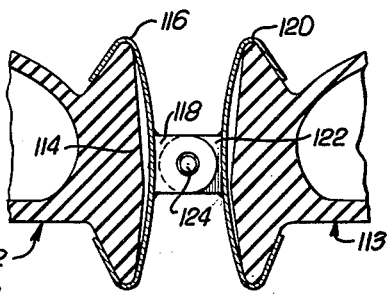
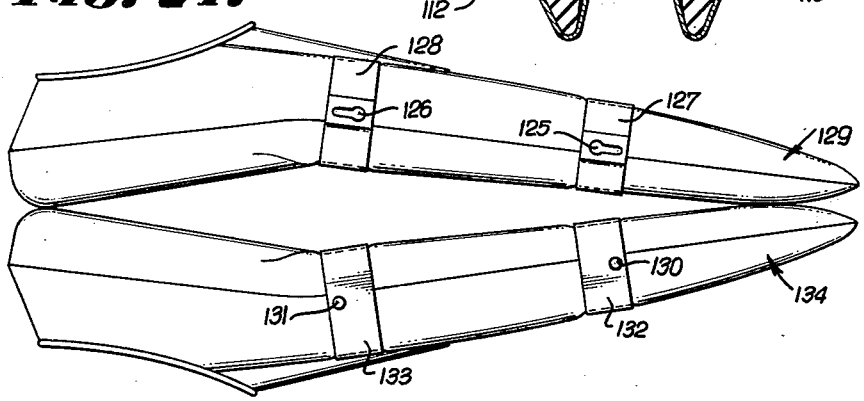
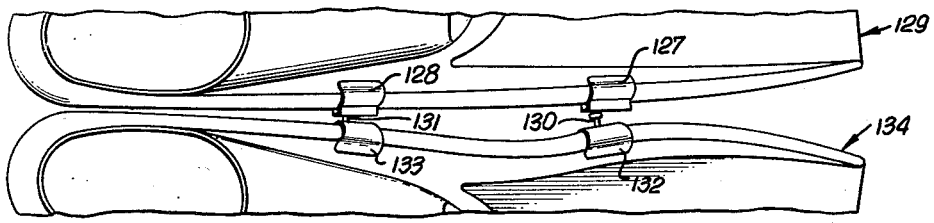
INVENTOR.
JAMES S. CHRISTIANSEN
BY
Flam and Flam
ATTORNEYS.

Jan. 19, 1965  J. S. CHRISTIANSEN  3,165,764
DETACHABLE COUPLING FOR SWIMMING FIN
Filed Oct. 15, 1962  7 Sheets-Sheet 7

INVENTOR.
JAMES S. CHRISTIANSEN
BY
Flam and Flam
ATTORNEYS.

United States Patent Office 3,165,764
Patented Jan. 19, 1965

3,165,764
DETACHABLE COUPLING FOR SWIMMING FIN
James S. Christiansen, Long Beach, Calif., assignor to Sports Industries, Inc., Gardena, Calif., a corporation of California
Filed Oct. 15, 1962, Ser. No. 230,582
16 Claims. (Cl. 9—309)

This invention relates to swimming fins.

Swimming fins are universally used by skin divers to increase swimming efficiency. Yet a diver's legs may cramp or fatigue after prolonged use of swimming fins. Fatigue may be avoided by using different muscles. Accordingly, an object of this invention is to provide apparatus by the aid of which swimming fins may be coupled together. New muscle groups effectively operate to produce a propelling thrust.

Another object of this invention is to provide attachments for existing swimming fins whereby the coupling can be accomplished.

Still another object of this invention is to provide several methods for securely affixing the apparatus to the side ribs of existing fins.

Another object is to provide apparatus that can readily be molded into, or as a part of, the swimming fins to achieve an effective coupling.

Still another object of this invention is to provide unique fastening apparatus which can be coupled and uncoupled by special foot movements. Thus a diver can change his mode of swimming without releasing equipment that he may be carrying.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a top plan view of a pair of swimming fins secured together in side by side relationship by the aid of a device forming one embodiment of the present invention;

FIG. 2 is an enlarged fragmentary sectional view taken along a plane corresponding to line 2—2 of FIG. 1;

FIG. 3 is a fragmentary sectional view taken along a plane corresponding to line 3—3 of FIG. 2;

FIG. 4 is a fragmentary sectional view, similar to FIG. 2 but illustrating a modified form of the present invention;

FIG. 5 is a fragmentary top plan view similar to FIG. 1, illustrating a modified form of the present invention;

FIG. 6 is a sectional view taken along a plane corresponding to line 6—6 of FIG. 5;

FIG. 7 is an enlarged fragmentary sectional view taken along a plane corresponding to line 7—7 of FIG. 6;

FIG. 8 is a side elevational view of a pair of swimming fins, and illustrating another modified form of the present invention;

FIG. 9 is a fragmentary top plan elevational view showing the fins of FIG. 8 attached by the aid of the device;

FIG. 10 is an enlarged fragmentary sectional view taken along a plane corresponding to line 10—10 of FIG. 9;

FIG. 11 is a fragmentary sectional view taken along a plane corresponding to line 11—11 of FIG. 10;

FIG. 12 is a side elevational view of a pair of swimming fins, showing companion fastener elements forming still another modified form of the present invention;

FIG. 13 is a fragmentary top plan elevational view, but showing the swimming fins of FIG. 12 in attached side by side relation;

FIG. 14 is an enlarged fragmentary sectional view, taken along a plane corresponding to line 14—14 of FIG. 13;

FIG. 15 is a side elevational view of a pair of swimming fins, and illustrating another modified form of the present invention;

FIG. 16 is a fragmentary top plan elevational view showing the fins of FIG. 15 attached by the aid of the device;

FIG. 17 is an enlarged fragmentary sectional view taken along a plane corresponding to line 17—17 of FIG. 16;

FIGS. 21 and 22 are fragmentary top plan elevational views showing the swimming fins of FIG. 20 in the process of being coupled and uncoupled respectively;

FIG. 23 is an enlarged fragmentary sectional view taken along a plane corresponding to line 23—23 of FIG. 22;

FIG. 24 is a side elevational view of a pair of detached swimming fins, and illustrating another modified form of the present invention;

FIGS. 25 and 26 are fragmentary top plan elevational views showing the swimming fins of FIG. 24 in the process of being attached and separated, respectively;

FIG. 31 is a fragmentary sectional view of companion swimming fins illustrating still another form of the present invention.

Figure 18:
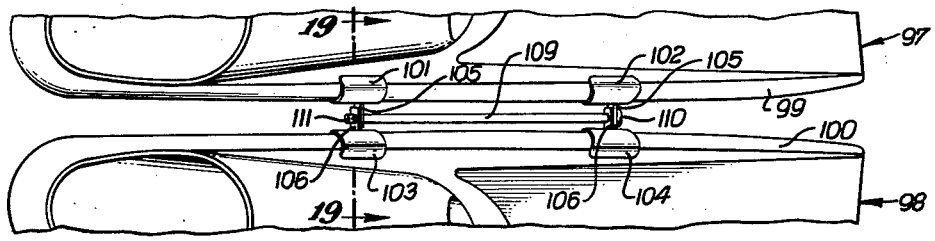
FIG. 18 is a fragmentary top plan elevational view of a pair of swimming fins attached by a device constituting still another modified form of the present invention.

In the form illustrated in FIGS. 1–3, a pair of swimming fins 10 and 11 are illustrated that are of a type corresponding, for example, to those shown in Cressi et al. Patent No. 2,737,668, issued March 13, 1956.

The swimming fins 10 and 11 are typical of most swimming fins which have lateral reinforcing ribs, as at 12 and 13. (See also FIG. 2). These lateral reinforcing ribs extend from the heel pocket, as at 14, to the forward edge 15 of the frontal fin portion 16. The lateral ribs control the degree of flexure of the front fin portion 16 relative to the foot receiving portion of the swimming fin. Despite the exclusive illustration in this application of such swimming fins, this invention contemplates attaching means for other types of swimming fins.

The swimming fins 10 and 11 are detachably secured together in side-by-side relationship, as illustrated in FIGS. 1 and 2, by the aid of a clamp structure 18 that firmly engages both fins at the reinforcing ribs. The clamp structure 18 releasably engages the lateral reinforcing ribs 12 and 13 on the inner sides of the fins 10 and 11.

The clamp structure includes companion upper and lower clamp parts 19 and 20 that may be made by forming stainless steel or other suitable sheet material. The upper clamp part 19 on one side has spaced-apart, generally parallel channels or recesses 21 and 22 that respectively overlie and substantially fit along the top edges of the lateral reinforcing ribs 12 and 13 of the respective fins. Correspondingly, the lower clamp part 20 has parallel channels or recesses 23 and 24 that receive and substantially fit along the lower edges of the lateral reinforcing ribs 12 and 13.

Central web portions 25 and 26 of the parts 19 and 20 project within the space between the side surfaces of the reinforcing ribs 12 and 13. The parts 19 and 20 are drawn together so as to lock about the fins by the aid of a pair of longitudinally spaced cam locks 27 and 28. Each of the locks is identical and a description of one will suffice as a description of the other.

A stud or screw 29 forming a part of one lock projects upwardly from the web 26 of the lower clamp part 20. An internally threaded sleeve 30 is mounted upon the screw 29 at a suitable position and projects upwardly through an opening 31 in the web 25 of the upper clamp part 19. A cam 32 formed from sheet metal or the like is pivotally mounted on the upper end of the sleeve 30 by the aid of a pin 33. The pin 33 projects through transverse apertures 34 in the sleeve 30 and is fastened at its ends to ears 35 of the cam 32.

The ears 35, as shown in FIG. 3, have their edges forming a cam surface to engage the upper surface of the web 25. In the dotted-line position of the cam 32, the lobe 36 is directly in line with the sleeve 30. Accordingly, the sleeve 30 is pulled upwardly through the aperture 31 to the maximum degree, and the clamp parts 19 and 20 are correspondingly in their closest position, and the swimming fins are tightly gripped. The fins resiliently yield to the clamping action, and urge the cam away from the unstable dotted-line position.

As the cam 32 moves only slightly in a counterclockwise direction from the dotted-line position to the fullline position, a thumb piece 37 formed on the cam 32 engages the web 25 and limits such movement. This corresponds to the locked position. Movement of the cam 32 in a clockwise direction from the dotted line position is unopposed by any stops, and the webs 25 and 26 move apart. The thumb piece 37 facilitates movement of the cam.

By manipulating both cams 27 and 28, the entire clamp structure can be released from the reinforcing ribs 12 and 13. Complete release or separation of the fins 10 and 11 may be accomplished by sliding the structure 18 along the ribs. The adjustably mounted sleeves 30 compensate for various sizes and types of fins.

In the form illustrated in FIG. 4, a pair of clamping parts 41 and 42 are provided that are similar to the clamping parts 19 and 20. But in order to move the clamp parts 41 and 42 together and apart, screws 43 (one of which is shown) are provided. The screw 43 has a knurled head 44 by the aid of which it may be manipulated. The upper portion of the screw 43 engages a nut 45 fastened to a web 46 of the upper clamp part 41, and the lower portion of the screw 43 is oppositely threaded to engage a nut 47 fastened to a web 48 of the lower clamp part 42. By rotating the screw 43 in one direction, the oppositely threaded portions draw the webs 46 and 48 together, and, correspondingly, by rotation of the screw 43 in the opposite direction, the web portions 46 and 48 are moved or permitted to move apart.

In the form of the invention illustrated in FIGS. 5, 6 and 7, another releasable clamping structure is provided. In the present example, a single wing nut 51 serves to attach a scissor-type clamping structure 52 to the inside ribs 53 and 54 of the swimming fins. The clamping structure 52 includes a pair of parts 55 and 56 located in side-by-side relationship. A removable pin 57 connects the parts 55 and 56 intermediate their lengths for relative pivotal movement. One end of the part 55 carries a bar 58 that engages the top surfaces of the ribs 53 and 54 at a place generally forwardly of the fins, and the other end of the part 55 carries a bar 59 that engages the lower edges of the ribs 53 and 54 at a place generally rearwardly of the fins.

The companion part 56 at one end carries a bar 60 that engages the top edges of the ribs 53 and 54 at a place rearwardly of the fins, and at the other end of the companion part carries a bar 61 that engages the lower edges of the ribs 53 and 54 at a place forwardly of the fins. By moving the parts 55 and 56 in one relative angular direction, all of the clamping bars 58, 59, 60 and 61 are urged firmly into engagement with the reinforcing ribs 53 and 54. By opposite relative movement of the parts 55 and 56 about the pin 57, the bars 58, 59, 60 and 61 are released.

In order to achieve this movement, the wing nut 51 engages a screw or stud 62 that is attached to the bar 59. The screw 62 projects upwardly through the bar 60 where it is engaged by the nut 51.

As in the previous form, the thumb nut and the clamp itself are for the most part positioned between the inner ribs 53 and 54 to avoid interference with marine growth, lines or other equipment.

The parts 55 and 56 may be provided with auxiliary holes for alternate positioning of the pivot pin 57 in order to ensure proper engagement despite variations in rib tapers of various existing swimming fins.

In the form of the invention illustrated in FIGS. 8, 9, 10 and 11, a pair of spring latch structures 63 and 64 are provided. The latch structures 63 and 64 operate to connect the reinforcing ribs 65 and 66 of the swimming fins at spaced positions therealong. The spring latch structures are identical and a description of one will serve as a description of the other.

Each latch structure, as for example the latch structure 63, includes a first clip 67 (FIG. 10) that may be clinched or otherwise attached to the rib 65 of one of the fins, and a second clip 68 that may correspondingly be attached to the rib 66 of the other of the fins. A bracket plate 69 is attached to the central portion of the clip 67 and mounts a hairpin spring 70 (see also FIG. 11) on its inner side. A screw 70a accomplishes the attachment.

The hairpin spring 70 has legs 71 provided at their inner ends with opposed arcuate portions 72. These portions form a locking recess 73. The legs diverge outwardly from a restricted opening of the recess 73 and generally parallel a rearwardly opening access recess 74 formed on the bracket plate 69.

A pin 75 is mounted on the companion latch part 68 and can enter the access recess 74. The pin 75 is of a size greater than the restricted opening to latching recess 73. Accordingly, to enter the recess 73, the hairpin spring 70 must be expanded. This is accomplished by exerting an adequate force on the pin 75. Once entered the pin is latched. The pin 75 has a head 76 (FIG. 10) that prevents axial separation of the parts.

The clamp parts 63 and 64 have their parts correspondingly oriented so that by a single movement, both latch structures can be simultaneously engaged or disengaged.

Referring to the form of the invention illustrated in FIGS. 12, 13 and 14, one of the fins 77 carries a channel 78. Spaced metal clips 79 and 80 to which spaced portions of the channel 78 are attached are in turn clinched or otherwise attached to the ribs 81 of the fin 77. A slide 82 is adapted to be received within the channel 78. The slide 82 is mounted by a short flange 83 that extends centrally along one side of the slide. The flange 83 is in turn mounted along the companion fin 84 by clips 85 and 86.

The rear end of the channel 78 is flared, in order to facilitate entrance of the tapered forward end of the slide 82. The channel 78, as shown clearly in FIG. 14, has sides encompassing the slide 82 and defining a narrow slot 87 just adequate to permit passage of the mounting flange 83 of the slide 82. Accordingly, when the parts are in mutual telescopic relationship, they cannot be separated by relative lateral movement.

In the present form, the coupling can be established merely by appropriate relative movement of the feet of the user. Since the swimming fins operate in unison, there is no relative longitudinal force tending to separate the coupling. Accordingly, the parts, when positioned, remain in coupled relationship. A latch, however, may be provided, if desired, in order to prevent accidental separation of the parts.

In the form illustrated in FIGS. 15, 16 and 17, a twist lock is provided for detachably coupling the swimming fins 88 and 89. The twist lock comprises a pair of parts 90 and 91 respectively attached to the ribs of the swimming fins 88 and 89. In the present example, the parts are made as plates that have inwardly turned ends for clinching the reinforcing ribs.

One of the parts 90 has a bracket 92 extending along the length thereof which projects laterally from the central portion of the part 90. The outer end of the bracket is inwardly curved to form a seat. This bracket 92 mounts a rod 93 in its seat as by pins 94. The inner portion of the rod is only slightly spaced from the central portion of the lock part 90. The other lock part 91 mounts a bracket 95 that has a curved configuration to fit the exposed portion of the rod 93 at a position opposite the bracket 92. The bracket 95 can enter the space between the bar 93 and its locking part 90, but only by a special deliberate movement. Thus, the separated fins 88 and 89 first are rotated toward, but not necessarily to, a back to back position as illustrated in FIG. 15. The bracket 95 is then positioned over the outwardly exposed area of the rod 93. The swimming fins are then rotated back to a side by side position as illustrated in FIGS. 16 and 17. The separation of the fins is accomplished by the reverse order of movement.

During normal joint use of the fins, the lock parts 90 and 91 are readily maintained in position, there being no substantial force tending to move the fins to a position in which uncoupling can be accomplished. In the present form, the swimming fins can be locked together or unlocked without requiring any use of the hands.

End tabs formed on the bracket 95 prevent relative longitudinal movement of the parts.

If desired, the bar 93 can be a magnet so that the bracket part 95, made of suitable magnetic material, is additionally magnetically adhered.

Figure 19:
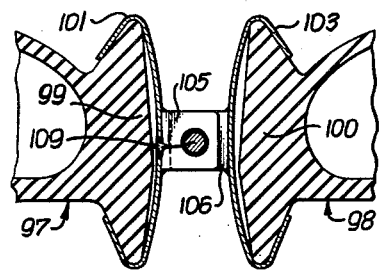
FIG. 19 is an enlarged fragmentary sectional view taken along a plane corresponding to line 19—19 of FIG. 18.
Figure 20:
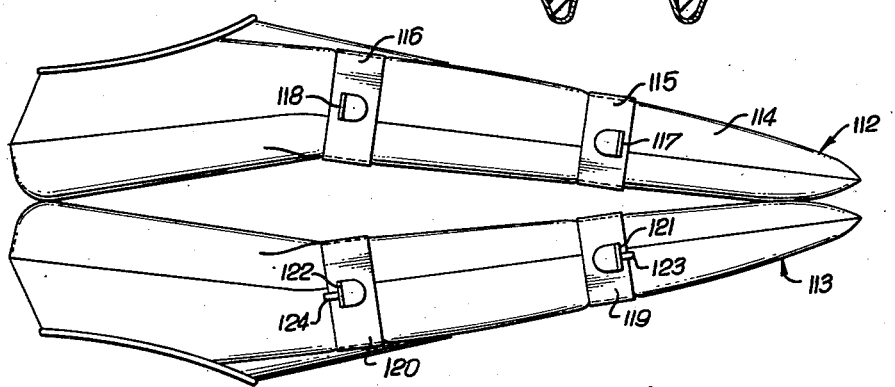
FIG. 20 is a side elevational view of a pair of detached swimming fins, and illustrating another modified form of the present invention.

In the form of the invention illustrated in FIGS. 18 and 19, the swimming fins 97 and 98 are releasably secured together in a manner that permits relative angular movement about an axis parallel to the reinforcing ribs 99 and 100.

The reinforcing rib 99 carries two spaced brackets 101 and 102 respectively aligned with brackets 103 and 104 carried on the rib 100 of the companion fin 98. The brackets 101 and 103 have outwardly extending ears or tabs 105 and 106 that may be placed in overlapping relationship. The brackets 102 and 104 are similarly placed. A locking rod 109 passes through aligned apertures of the tabs to secure the tabs against separation.

The rod 109 has a head 110 that limits movement of the rod in one direction. A nut 111, threadedly accommodated on the other end of the rod 109, is exemplary of a class of devices for use in keeping the rod in place.

In the form of the invention illustrated in FIGS. 20, 21, 22 and 23, the resilience or flexible characteristics of the swimming fins 112 and 113 (or at least one of them) are utilized for maintaining the swimming fins in coupled relationship.

The rib 114 of one of the swimming fins 112 carries spaced sheet metal or other clips 115 and 116. Ears 117 and 118, struck from the parts 115 and 116, extend laterally outwardly and are provided with chamfered apertures.

The companion swimming fin 113 carries clips 119 and 120 that also have ears 121 and 122 that may be placed in overlapping relationship with the ears 117 and 118 respectively. The ears 121 and 122, however, instead of having apertures, are provided with pins 123 and 124 that extend in opposite directions from the respective ears 121 and 122.

Figure 21:
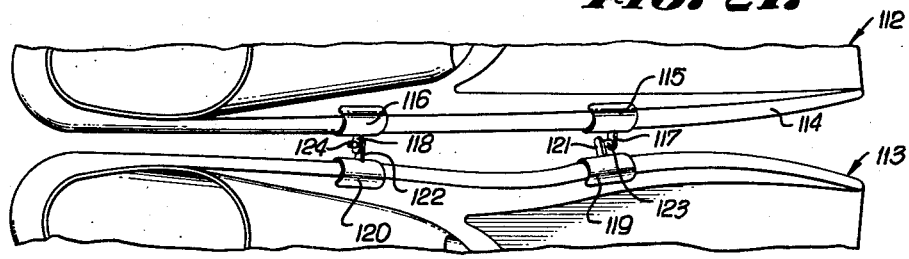
Figure 26:
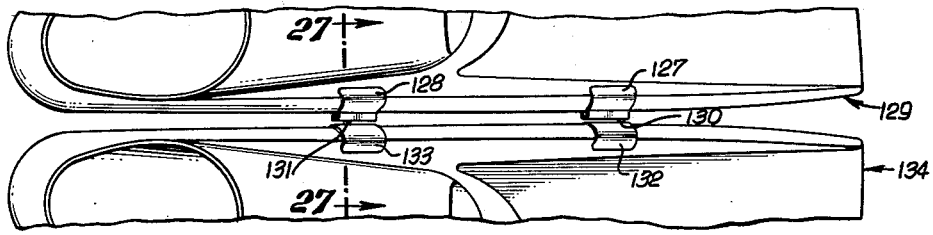

The pin 124 is designed to engage the aperture of the ear 118, and the pin 123 is designed to engage the aperture of the ear 117. However, the distance between the ends of the pins 123 and 124 is greater than the distance between the ears 117 and 118. Accordingly, in order to position the pins 123 and 124 in their respective apertures, the swimming fin 113 must be flexed, as illustrated in FIG. 21. The pins 123 and 124 are preferably tapered at their ends to facilitate registry with the apertures of the ears 117 and 118.

In the position illustrated in FIG. 22, the fin 113 has been released, the parts are engaged, and a coupling between the fins is established. Other orientations of the pins are possible to achieve like operation.

An arrangement similar to that shown in FIGS. 20 to 23 is illustrated in FIGS. 24 to 27. Oppositely directed keyhole slots 125 and 126 are formed on spaced clips 127 and 128 of one fin 129, and headed pins 130 and 131, cooperable with the keyhole slots 125 and 126, are mounted upon clips 132 and 133 attached to the companion fin 134.

Figure 27:
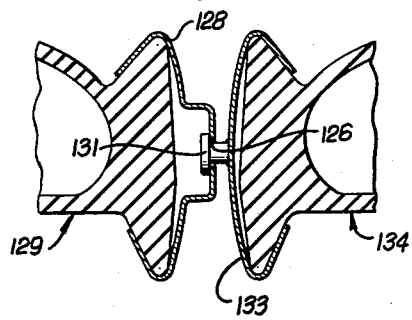
FIG. 27 is an enlarged fragmentary sectional view taken along a plane corresponding to line 27—27 of FIG. 26.

The keyhole slots 125 and 126, as illustrated in FIG. 27, are formed on intermediate inwardly offset portions of the respective parts 127 and 128 in order to provide spaces for the reception of the pins 130 and 131. The pin 130, for example, is capable of entering the enlarged part of the keyhole slot 125 for movement toward the restricted portion of the slot 125, thereby to establish a coupling. Similarly, the pin 131 cooperates with the keyhole slot 126. However, the distance between the pins 130 and 131 is greater than the distance between the enlarged portions of the keyhole slots 125 and 126, the remote portions of the keyhole slots extending respectively away from each other. Accordingly, in order to position both pins 130 and 131, the fin 134 must be flexed, as illustrated in FIG. 25. The resilience of the fin 134 is utilized to maintain the parts in the assembled position illustrated in FIG. 26. Other arrangements are possible.

Figure 28:
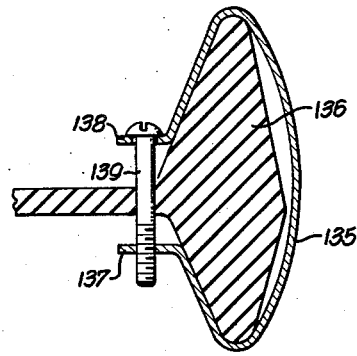
FIGS. 28, 29 and 30 are fragmentary transverse sectional views, each illustrating different structures for attaching devices to the lateral rib of a swimming fin.
Figure 30:
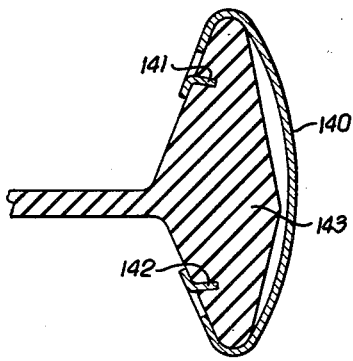
Figure 29:
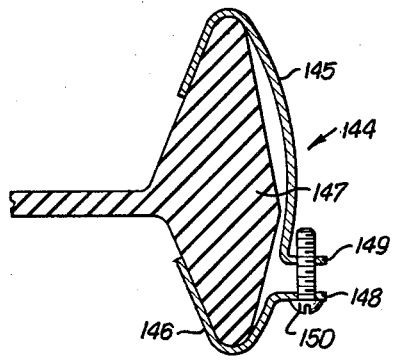

FIGS. 28, 29 and 30 illustrate various alternate methods of attaching brackets to the swimming fins.

In the form illustrated in FIG. 28, a bracket 135 substantially encompasses the reinforcing rib 136. Ears or flanges 137 and 138 are located below and above the main body portion of the fin, and a screw 139 passes bodily through the fin. One end of the screw engages about the ear or flange 138, and the other end remotely engages the flange 137. Accordingly, by rotating the screw 139, the bracket 135 is constricted about the rib 136.

In the form illustrated in FIG. 30, the bracket 140 encompasses the ribs. Inwardly struck projections or prongs 141 and 142 bite into the inner portion of the reinforcing rib 143 in order to achieve attachment.

In the form illustrated in FIG. 29, the bracket 144 includes two companion parts 145 and 146, one of which engages over the top edge of the reinforcing rib 147, and the other of which engages about the lower portion of the rib 147. Companion flanges or ears 148 and 149 in this instance are located on the outer side of the rib 147, and a screw 150 urges the parts together to achieve a suitable attachment.

Of course, it is contemplated that brackets and parts may be inserted in molds for swimming fins, thereby achieving durable attachment. Some of the metal parts may be made as integral rubber parts of the swimming fins. The form of the invention shown in FIG. 31 incorporates both these ideas.

Thus, the rib 151 of one of the swimming fins has embedded therein a metal part 152 that extends along the length of the rib. The inner end of the metal part has a series of grooves 153 forming teeth for interlocking the rubber material of the rib 151. The rib 154 of the companion swimming fin has a longitudinal groove or recess 155 cast therein. The groove 155 has a restricted opening 156 through which the head 157 of the metal insert 152 passes to enter the recess 155. The detachable coupling for companion fins is accordingly provided.

In place of the single metal part 152, a series of pins could be provided disposed along the length of the corresponding rib.

The inventor claims:

1. In combination: a pair of swimming fins each having longitudinally extending reinforcing ribs or flanges along the opposed inside edges of the respective fins, said reinforcing ribs or flanges each having top and bottom longitudinally extending edges; and releasable coupling means for detachably securing the fins in side by side relationship, said coupling means having parts engageable with the edges of the reinforcing ribs of both fins.

2. The combination as set forth in claim 1, in which said releasable coupling means comprises: a clamp structure having a pair of elements, one of said elements engaging the top edges of the ribs or flanges of both fins, and the other of said elements engaging the bottom edges of the ribs or flanges of both fins; and means for drawing the said clamp elements together.

3. The combination as set forth in claim 2, in which said means for drawing the elements together comprises an extensible portion attached to one of the elements and extending through the other of the elements, and a cam pivoted on the end of said extensible portion for movement about an axis transverse to said extensible portion, said cam having an operative surface directly engaging the other of said elements to urge the elements together upon angular movement of the cam.

4. The combination as set forth in claim 2, in which said means for drawing the elements together comprises a screw having threaded portions of opposite hand threadedly engaging the respective clamp elements.

5. The combination as set forth in claim 1, in which said releasable coupling means comprises: a pair of clamp elements pivoted together for movement about an axis transverse to the swimming fins; one of said clamp elements at one end engaging the top edges of the ribs or flanges of both fins at the forward portions thereof, and at the other end engaging the bottom edges of the ribs or flanges of both fins at the rearward portions thereof, the other of said clamp elements at one end engaging the bottom edges of the ribs or flanges of both fins at the forward portions thereof, and at the other end engaging the top edges of the ribs or flanges of both fins at the rearward portions thereof; and means for moving the clamp parts in one angular direction for causing said clamp parts to engage said fins.

6. The combination as set forth in claim 5, in which said clamp parts are pivoted together at one of a number of selected positions.

7. The combination as set forth in claim 1, in which said releasable coupling means comprises: a channel element attached to one of the fins; and a slide attached to the other of the fins and slidably received in said channel.

8. The combination as set forth in claim 1, in which said releasable coupling means comprises: brackets attached to the respective fins and having apertures aligned with each other as the fins are placed in side by side relationship; and a locking member movable into the aligned bracket apertures for securing the brackets against lateral separation.

9. The combination as set forth in claim 1, in which said releasable coupling means comprises: a pair of spring clips mounted on the rib or flange of one of the fins; a pair of pins respectively adapted to be releasably locked by said spring clip and mounted on the rib or flange of the other of the swimming fins.

10. In combination: a pair of swimming fins made of flexible resilient material; a first pair of separable interengaging parts respectively carried on the inner sides of the respective fins; a second pair of separable interengaging parts respectively carried on the inner sides of the respective fins in longitudinally spaced relationship to said first pair; engagement and disengagement of said pairs of parts requiring opposite relative longitudinal movement of said swimming fins; said pairs of parts being so positioned that both pairs of parts may be simultaneously engaged whereby engagement of both pairs of parts requires flexure of one of said fins; the resilience of said fins maintaining said parts in engagement.

11. The combination as set forth in claim 10 in which each pair of parts comprises keyhole slot forming means and a pin, the keyhole slot forming means being oppositely oriented with respect to each other.

12. The combination as set forth in claim 10 in which each pair of parts comprises a pin extending generally longitudinally of the fin and means forming an aperture for receiving the pin; the pins of the respective pairs of parts extending in opposite directions.

13. In combination: a pair of swimming fins each having longitudinally extending reinforcing ribs or flanges along the opposed inside edges of the respective fins, said reinforcing ribs or flanges each having top and bottom longitudinally extending edges; clips attached to said flanges and engageable about the top and bottom edges thereof; and releasable interlocking means carried by the clips for detachably securing the fins in side by side relationship.

14. The combination as set forth in claim 13 in which said clips substantially encompass said flanges, and are provided with prongs for gripping them.

15. In combination: a pair of swimming fins each having longitudinally extending reinforcing ribs or flanges at least along their inner edges; clips attached to said inner flanges; releasable interlocking means carried by the clips for detachably securing the fins in side-by-side relationship; said clips substantially encompassing said flanges with the ends of the clip on opposite sides of the fins; and screw means passing through the fins and engaging the ends of the clips for constricting them about the flanges.

16. In combination: a pair of swimming fins each having longitudinally extending reinforcing ribs or flanges at least along their inner edges; clips attached to said inner flanges; releasable interlocking means carried by the clips for detachably securing the fins in side-by-side relationship; said clips being each made in two parts for together encompassing said flanges with companion ends of the clip parts located laterally of the flanges; and screw means engaging the ends of the clips for drawing the clip parts together for attachment to the fin flanges.

References Cited in the file of this patent

UNITED STATES PATENTS

| | | |
|---|---|---|
| 97,872 | Burkhardt | Dec. 14, 1869 |
| 610,967 | Hill | Sept. 20, 1898 |
| 1,726,790 | Andrews | Sept. 3, 1929 |
| 2,536,390 | Pobochenko | Jan. 2, 1951 |
| 2,737,668 | Cressi | Mar. 13, 1956 |
| 2,821,762 | Foose | Feb. 4, 1958 |
| 2,932,868 | Imparato | Apr. 19, 1960 |
| 2,938,220 | Puckett | May 31, 1960 |

FOREIGN PATENTS

| | | |
|---|---|---|
| 1,085,798 | Germany | July 21, 1960 |
| 6,829 | Great Britain | 1911 |
| 304,999 | Italy | Jan. 24, 1933 |